(No Model.)
E. WYCKOFF.
FURROWER AND COVERER.
No. 425,359. Patented Apr. 8, 1890.
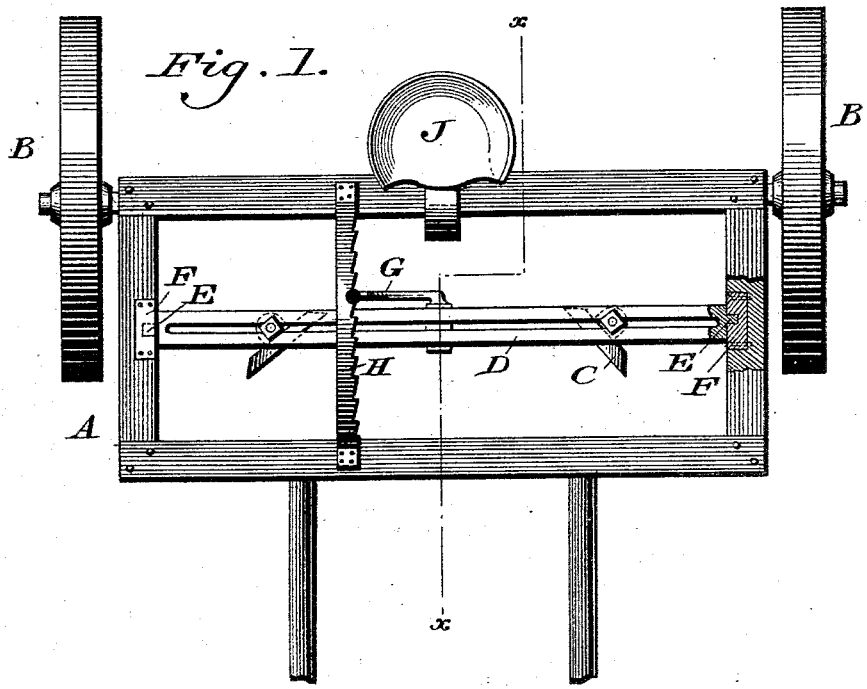
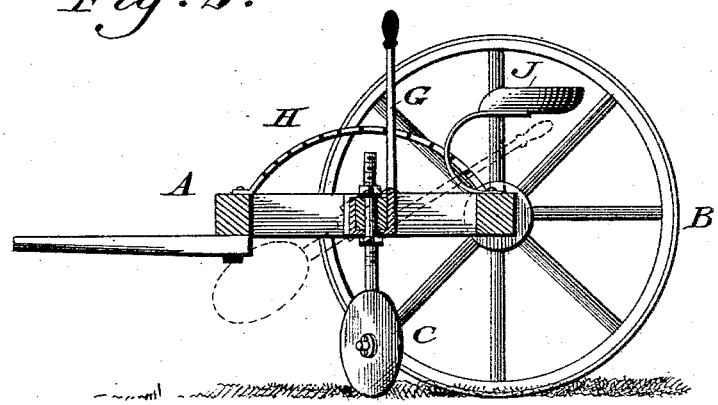
WITNESSES:
INVENTOR: Edwin Wyckoff
BY John A. Diedersheim
ATTORNEY.

UNITED STATES PATENT OFFICE.

EDWIN WYCKOFF, OF CAMDEN, NEW JERSEY.

FURROWER AND COVERER.

SPECIFICATION forming part of Letters Patent No. 425,359, dated April 8, 1890.

Application filed October 4, 1889. Serial No. 325,977. (No model.)

*To all whom it may concern:*

Be it known that I, EDWIN WYCKOFF, a citizen of the United States, residing in the city and county of Camden, State of New Jersey, have invented a new and useful Improvement in Furrowers and Coverers, which improvement is fully set forth in the following specification and accompanying drawings.

My invention relates to improvements in the furrower and coverer for which Letters Patent of the United States were granted to me on the 12th day of March, A. D. 1889, the same consisting in connecting furrowing and covering wheels with a rotary beam, whereby they may be raised, when required, so as to be placed out of operative position without affecting their primary adjustment.

Figure 1 represents a top or plan view of a furrower and coverer embodying my invention. Fig. 2 represents a vertical section on line $x$ $x$, Fig. 1.

Similar letters of reference indicate corresponding parts in the two figures.

Referring to the drawings, A designates the frame of the device, and B the wheels thereof.

C designates the furrowing and covering wheels, which are connected with the slotted cross bar or beam D and made both vertically and laterally adjustable, similar to those shown in the Letters Patent heretofore referred to. In said Letters Patent the cross bar or beam is fixed to the sides of the frame A. In the present case said beam is provided on its ends with journals or gudgeons E, which freely enter socket-plates F, secured to said sides, whereby the beam may rotate or rock on said plates as its bearings, by which provision by properly turning the beam the wheels may be raised clear of the ground, (see dotted lines, Fig. 2,) a feature of importance when it is desired to render the device inoperative, as when going to and returning from the field, &c. When the beam is rotated or turned in the other direction, the wheels may be lowered, and thus placed in operative position. (See full lines, Fig. 2.)

In order to hold the wheels C in elevated or lowered position and prevent the beam from turning, there is attached to the beam a lever G, which is adapted to interlock the teeth of a circular rack H, the latter being secured to the frame, said lever being within convenient reach of the driver's seat J, so as to be readily operated.

Having thus described my invention, what I claim as new, and desire to secure by Letters Patent, is—

1. In a combined furrower and coverer, the combination of a frame, a rotatable beam slotted throughout its length and having journals mounted in the sides of the frame, furrowing and covering wheels adjustable in the slot of said beam and adapted to be stationarily secured in their adjustment, a rack secured to the said frame, and a locking-lever secured to said beam, substantially as described.

2. In a combined furrower and coverer, the combination of a frame A, a rotatable beam D, having a slot therein extending throughout its length, and end gudgeons E, having bearing in socket-plates F in the frame, furrowing and covering wheels having extended shanks projecting through the slot of beam D and having set-nuts to clamp the same in said beam D, the lever G, connected to said beam D to turn the same, and thereby raise and lower the furrowing and covering wheels, and the rack H, engaged by said lever G, substantially as described.

EDWIN WYCKOFF.

Witnesses:
JOHN A. WIEDERSHEIM,
WM. C. WIEDERSHEIM.